Figure 1:
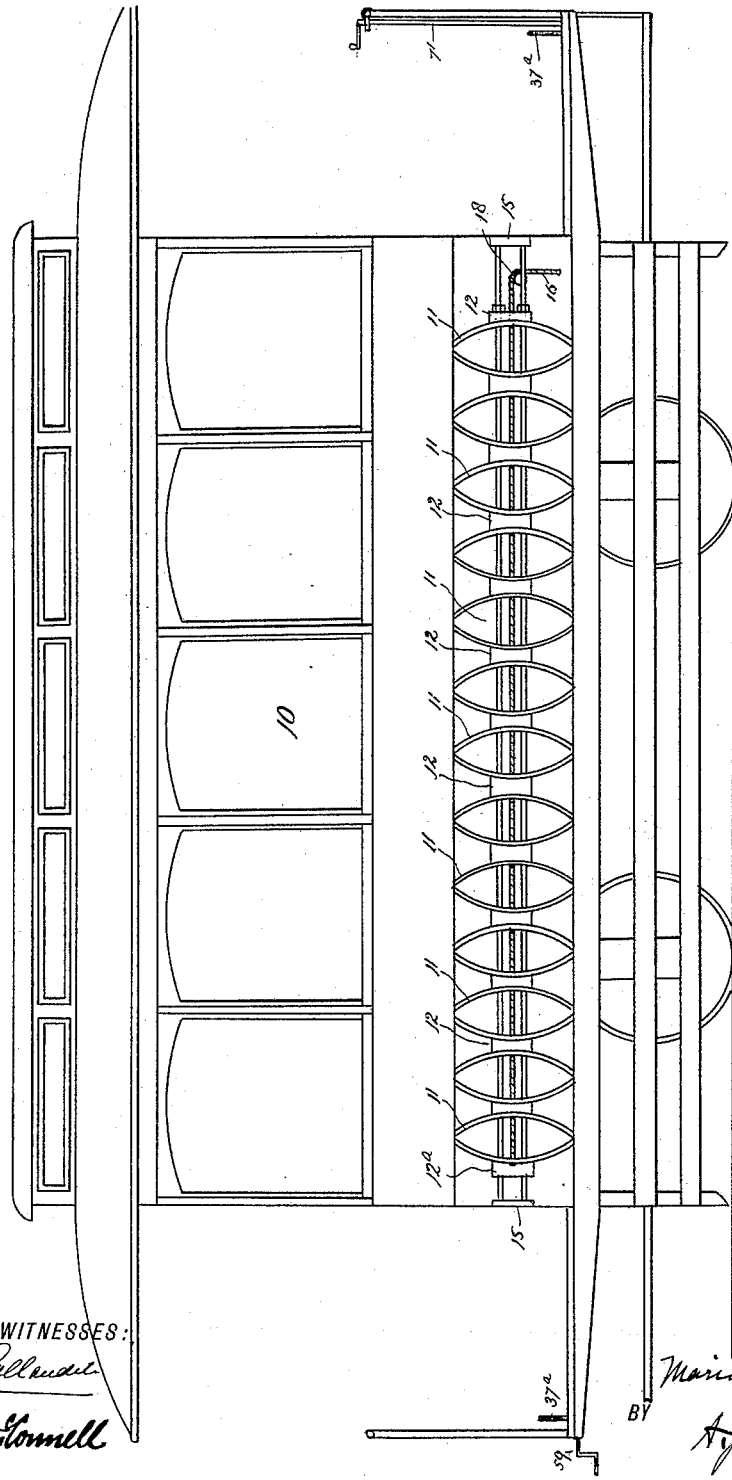

(No Model.) 3 Sheets—Sheet 1.
M. M. BAILEY.
MOMENTUM RESERVOIR MOTOR.

No. 465,122. Patented Dec. 15, 1891.

(No Model.) 3 Sheets—Sheet 2.
M. M. BAILEY.
MOMENTUM RESERVOIR MOTOR.
No. 465,122. Patented Dec. 15, 1891.
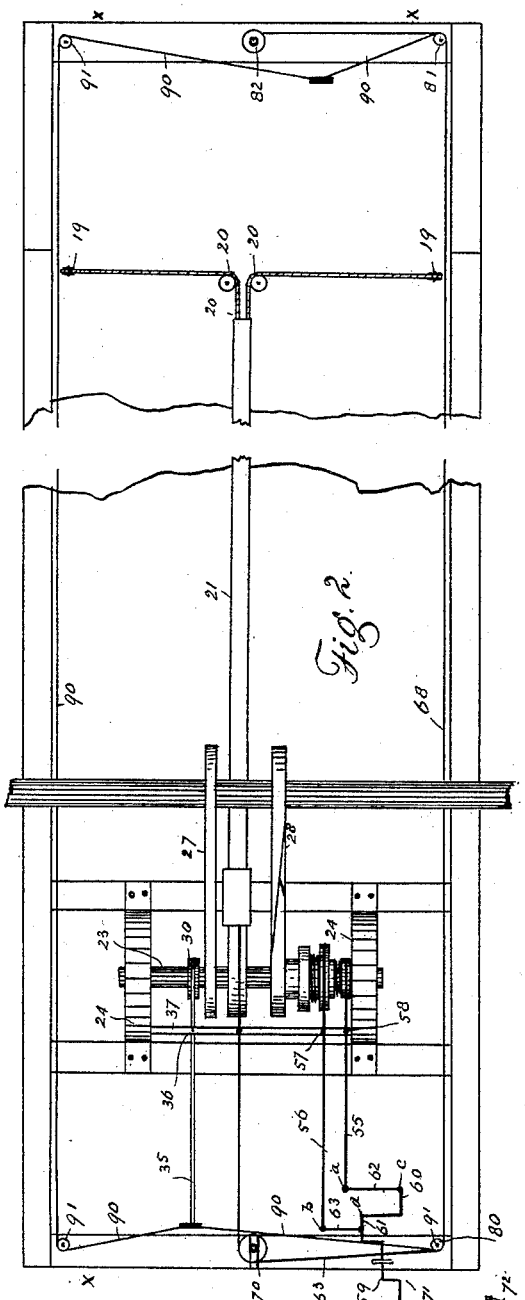
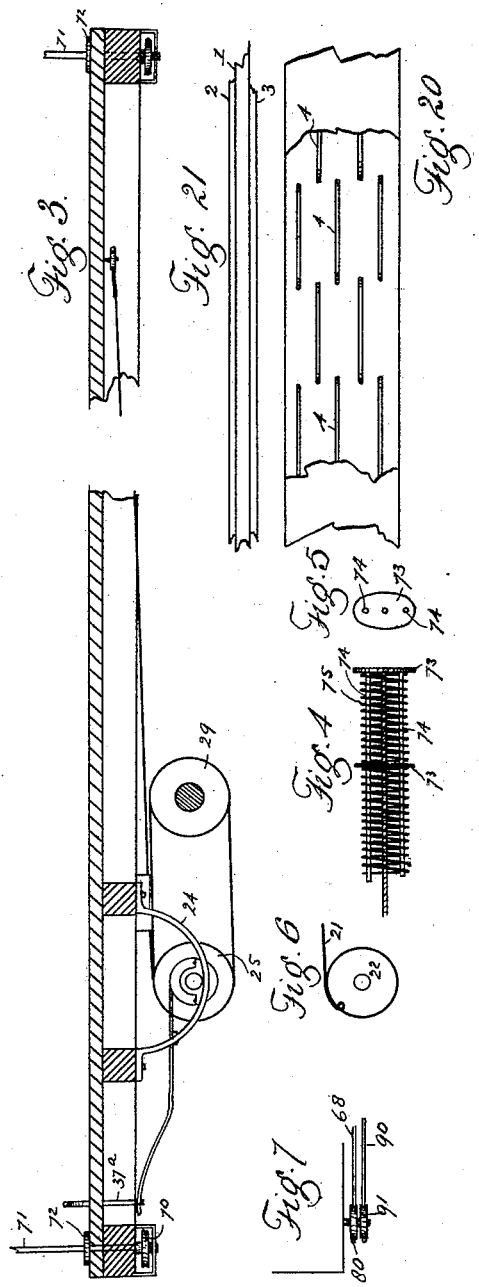
WITNESSES:
INVENTOR
Marion M. Bailey
BY A. J. O'Brien
ATTORNEY.

(No Model.) 3 Sheets—Sheet 3.
M. M. BAILEY.
MOMENTUM RESERVOIR MOTOR.
No. 465,122. Patented Dec. 15, 1891.
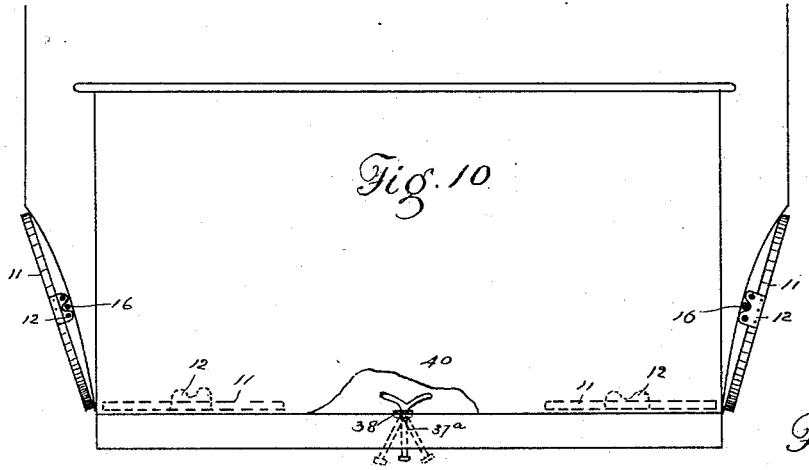
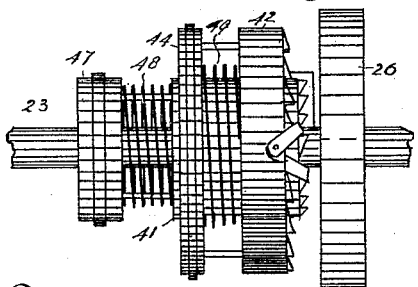
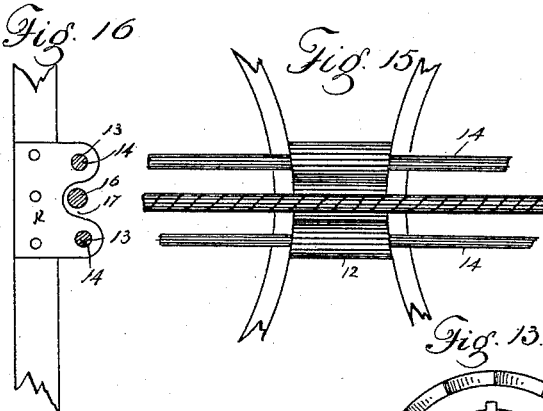
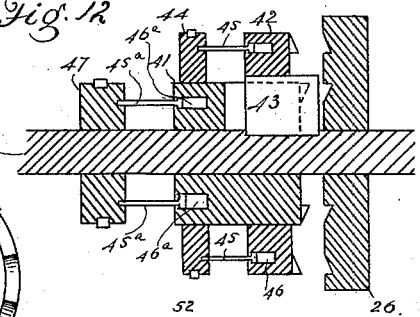
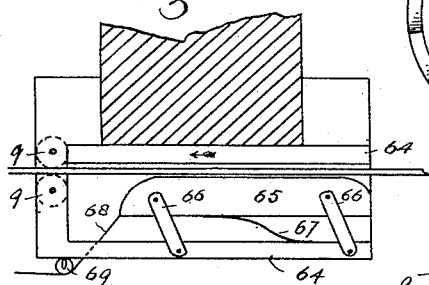
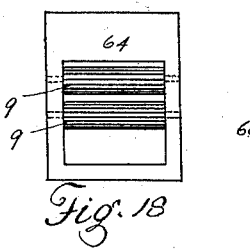
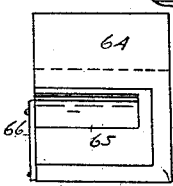
WITNESSES:
G. J. Rollandet
Wm. M. Connell
INVENTOR
Marion M. Bailey
BY A. J. O'Brien
ATTORNEY.

UNITED STATES PATENT OFFICE.

MARION M. BAILEY, OF DENVER, COLORADO, ASSIGNOR OF ONE-FIFTH TO ANDERSON M. HOLMES, OF SAME PLACE.

MOMENTUM-RESERVOIR MOTOR.

SPECIFICATION forming part of Letters Patent No. 465,122, dated December 15, 1891.

Application filed February 28, 1891. Serial No. 383,142. (No model.)

*To all whom it may concern:*

Be it known that I, MARION M. BAILEY, a citizen of the United States of America, residing at Denver, in the county of Arapahoe and State of Colorado, have invented certain new and useful Improvements in Momentum-Reservoir Motors; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in mechanism whereby the momentum acquired by a vehicle is so stored in stopping the same as to be again utilized in starting the conveyance.

The object of this mechanism is the saving of labor in applying the ordinary brake to the wheels of the car and the consequent wear and tear by reason of the friction between the brake-shoe and the periphery of the wheels, and also the saving of power necessary in running the vehicle, since the momentum heretofore lost in stopping the car is by this mechanism used in starting the same.

The further object of my invention is to provide a device which, while being thoroughly practicable for the purpose stated, shall also be simple in construction, economical in cost, and reliable, durable, and efficient in operation.

To these ends my invention consists of the features, arrangements, and combinations hereinafter described and claimed, reference being had to the accompanying drawings, wherein is illustrated an embodiment of the invention.

In the drawings, Figure 1 is a side elevation of a car provided with my improved mechanism. Fig. 2 is an underneath view of a car provided with my improvement, the bottom of the car being partly broken away in the center for the lack of space. Fig. 3 is a longitudinal section taken on the line $x\,x$, Fig. 2. Fig. 4 is a modified form of spring, and Fig. 5 a detail of the same. Figs. 6, 7, 8, and 9 are details of the mechanism; Fig. 10, an end elevation of a car provided with my improvement; Fig. 11, an enlarged view, in detail, of my improved double clutch; Fig. 12, a longitudinal section taken through the center of the same; Fig. 13, a face view of the clutch; Fig. 14, an enlarged fragmentary view illustrating a detail of the clutch; Fig. 15, an enlarged fragmentary view of the spring mechanism, guides, and cable. Fig. 16 is a view of the same mechanism from a different position; Fig. 17, a side view, in detail, of a brake-shoe engaging the main belt. Fig. 18 is a front view of the casing inclosing this shoe and showing the guide-rollers between which the belt passes. Fig. 19 is a rear view of the brake-shoe supported within the casing. Figs. 20 and 21 are plan and side views, respectively, of a modified form of belt for use in connection with the mechanism.

In the views, wherein similar reference-characters indicate corresponding parts or elements of the mechanism, let the numeral 10 designate a car provided on either side with a series of elliptical springs 11, united by blocks 12. Two of these blocks $12^a$ and $12^b$ are end blocks engaging the first and last springs on the outside. Blocks 12 are secured to the springs and project inward therefrom, these projections being provided with apertures 13, through which pass the stationary guide-rods 14, having their extremities rigidly secured to the ends of the car, as shown at 15 15. All the blocks 12 are movable upon the guide-rods except block $12^b$, toward which the springs are drawn. This block must be stationary in order to give resistance for the compression of the springs. To block $12^a$, which is located at the opposite extremity from block $12^b$, is secured one extremity of a cable 16, which lies in a recess 17, formed in blocks 12 between apertures 13. This cable passes thence from block $12^a$ through the recesses formed in the blocks the entire length of the series of springs and passes over a guide-pulley 18, secured to the sides of the car, and thence through the bottom of the car and over guide-pulleys 19 and 20.

It will be observed that there is a cable 16 on each side of the car. Both these cables terminate at a central point $20^a$ underneath the floor of the car, where they are attached to a belt 21, secured at its opposite extremity to a pulley 22, mounted upon a shaft 23, suitably journaled in the bow-shaped support 24. Pulley 22 is rigidly secured to this shaft, which is also provided with loose pulleys 25 and 26, connected by means of belts 27 and 28 with pulleys 29, mounted upon the axle of the car and rigidly secured thereto. Pulleys 25 and 26 are made fast upon the shaft for the purpose of communicating motion thereto from the axle by means of clutches 30 and 31. Clutch 30 is an ordinary disk slidingly secured upon the shaft and provided with a notched, toothed, or serrated face adapted to engage a correspondingly-recessed face upon the adjacent side of pulley 25. This clutch-disk is provided with a circumferential groove engaged by the forked extremity of a lever 35, fulcrumed upon a stationary cross-bar 37. Lever 35 is actuated by another lever 37$^a$, which is pivoted at the forward extremity of lever 35, fulcrumed at 38 and terminating in a forked extremity 40 above the floor of the car. Near the outer extremity of lever 35 and near its connection with lever 37$^a$ is attached a cord or chain 90, which extends entirely around the car, being guided by a pulley 91, located at each corner. At the opposite end of the car from its connection with lever 35 cord or chain 90 is attached to the lower extremity of another lever 37$^a$, designed to be actuated by the foot in the manner hereinafter explained.

Lever 37$^a$ is adapted to be manipulated by the foot for the purpose of moving lever 35 in actuating the clutch 30. Clutch 31 is double and consists of an inner member 41 and an outer member 42. Part 41 is slidingly secured upon its shaft by a spline 43, which extends beyond the periphery of part 41 and enters a correspondingly-shaped groove in part 42. From this construction it will be seen that, while the members of this clutch slide freely upon each other longitudinally in either direction they rotate together and with the shaft 23. The outer member 42 of this clutch is connected with a disk 44 by arms or pins 45, which are rigidly secured to the disk at one extremity, while their opposite extremities are secured within sockets 46, formed in member 42. These sockets are of such depth as to allow the extremities of arms 45 a certain movement thereon, said extremities being fashioned to move freely within the sockets, which are contracted at the outer surface of the member, so as to prevent the heads formed on the pins from slipping out of the sockets. Member 41 of the clutch is connected with a disk 47, mounted upon shaft 23, by pins 45$^a$, rigidly secured to the disk at one extremity and movably connected with member 41 at the opposite extremity in the same manner as disk 44 is connected with member 42. Surrounding shaft 23 and lying between disk 47 and one extremity of member 41 is a coil-spring 48, which normally maintains the disk and the member as far apart as pins 45$^a$ will permit by virtue of the construction heretofore given. It will, however, be observed that pressure upon the opposite end of member 41 will cause said member to approach disk 47 until the member and the disk are as near each other as pins 45$^a$ will permit. Surrounding member 41 and lying between disk 44 and member 42 is another coil-spring 49, normally holding the disk and the member as far apart as arms 45 will permit, but allowing said parts to approach each other by pressure upon the opposite face of the member 42.

Members 41 and 42 of the double clutch are provided with teeth upon the face opposite those engaging springs 45 and 46. These teeth are adapted to engage the adjacent face of pulley 26, which is provided with recesses to receive said teeth. The teeth of the two members of the clutch are oppositely disposed, as shown in the drawings, while the recesses in the adjacent face of pulley 26 for the reception of these teeth consist of two sets, one set for the teeth of each member, these recesses being shaped to correspond with the form of the teeth which they engage. These teeth and their recesses are so shaped that when a single member of the clutch engages pulley 26 shaft 23 may rotate freely in one direction without turning the pulley, while as soon as said shaft begins to rotate in the opposite direction the clutch and pulley rotate together.

From the construction hereinafter set forth it will be observed that both members of the double clutch are never in engagement with pulley 26 at the same time. Hence it follows that shaft 23, carrying the clutch, may always move in one direction without affecting the movement of pulley 26, while the movement of said shaft in the opposite direction always causes said pulley to rotate with it by reason of the engagement of one member of the double clutch. Each member of this clutch is provided with a pawl 50, pivoted thereon and so constructed and located that it may project toward pulley 26 farther than the teeth of the clutch. The object of these pawls is to prevent the clicking sound attending the moving of a toothed or serrated face over a correspondingly-recessed face, as when one face is stationary or when the two faces are rotating in opposite directions and held together by means of springs. These pawls 50 are pivoted within recesses 51, formed in the peripheries of the two members of the clutch, and held in engagement with the face of pulley 26 by a weak spring 52. One side 53 of recess 51 is straight, while the other side 54 is curved or inclined. The spring 52 normally holds the pawl in an inclined position as compared with side 53, or about as shown in Fig. 14.

I will suppose member 41 of the double clutch is illustrated in Fig. 14 and that this member of the clutch is in engagement with pulley 26. Now if shaft 23 is rotating in the direction indicated by the arrow in Fig. 14 the pawl 50 will be carried to the position shown by dotted lines in Fig. 14, thus holding the teeth of the clutch from engagement with the face of pulley 26 for the purpose stated. Then if the movement of shaft 23 is reversed the pawl will be carried to the position shown in full lines in Fig. 14, permitting the teeth of the clutch to engage the recesses of the pulley, whereby the clutch and pulley rotate together.

The members of the double clutch are actuated by the manipulation of two levers 55 and 56, fulcrumed at points 57 and 58 and terminating in forked extremities engaging disks 47 and 44, respectively, the peripheries of the disks being provided with circumferential grooves adapted to receive the forked extremities of the levers, the construction being such that the disks may rotate freely while engaging the levers. These levers are manipulated by the use of a crank 59, provided with arms 60 and 61, projecting from opposite sides of the axis and pivotally connected with the outer extremities of levers 55 and 56, respectively, by the use of pitman or connecting rod 62 and 63, respectively. The rods are pivoted to the levers at points $a$ and $b$ and to the crank at points $c$ and $d$. It will thus be seen that, assuming member 41 of the clutch to be in engagement with the pulley 26 when the crank is in the position shown in Fig. 2, if the position of this crank be reversed or given half a rotation member 41 will be disengaged from the pulley and member 42 driven to engagement therewith by virtue of the action of levers 55 and 56 upon disks 47 and 44.

Located beneath belt 21 and supported in a frame 64, through which the belt passes, is a brake-shoe 65, pivoted to the upper extremities of two arms 66, the lower extremities of these arms being pivoted to the frame 64. The shoe is supported underneath by a leaf-spring 67, which normally holds it in engagement with the belt.

Referring to Fig. 17, the belt, when winding up, is supposed to be traveling in the direction indicated by the arrow. The arms 66 are inclined, as shown in this figure, and when the shoe is not acted upon by its spring 67, though it will engage the belt, the forward movement of the latter will be only slightly retarded, because the friction between the belt and the shoe has a tendency to increase the inclination of arms 66, and therefore to draw the shoe away from the belt. It will be observed, however, that the shoe normally resists the backward movement of the belt for the reason that the friction between these parts has a tendency to move arms 66 toward the perpendicular, and therefore to draw the shoe tightly against the belt. The action of this shoe upon the belt is controlled by a cord, chain, or belt 68, connected with the forward extremity of the shoe, and, passing downward under a guide-pulley 69, connected with the frame, leads to the sprocket-wheel 70, rigidly secured to the lower extremity of the rotating brake-rod 71, provided with a ratchet-disk 72, locked by a pawl pivoted upon the platform of the car in the usual way. Belt 68 passes around the sprocket-wheel, thence to the right-hand corner of the car, around a pulley 80, thence along the side of the car to the opposite end and around a corner pulley 81, and thence to the center of the car, when it is secured to a pulley 82, rigidly secured to the lower extremity of the rotating brake-rod.

It must be understood that the portion of belt 56 which passes around or engages sprocket-wheel 70 must be provided with apertures to receive the teeth or lugs on the periphery of the wheel; or it would be better if this portion of the belt consisted of a piece of sprocket-chain. It will thus be seen that by the use of the brake-rods on either end of the car shoe 65 may be drawn downward free from contact with belt 21, and locked in this position. The shoe may then be released at will when it is necessary or desirable that it should engage the belt. Frame 64 is provided with suitable guide-rollers 9 9, between which belt 21 passes.

In place of the elliptical springs shown in Fig. 1 and heretofore described, the coil-springs 75 (shown in Fig. 4) may be used. In this case the cable 16 is secured at one extremity to a plate 73, and passes thence through the center of the coil, as shown. The guide-rods 14 are also surrounded by the coil and pass through apertures 74, formed in plates 73.

Spring 75 is preferably formed in sections, as shown, so that if broken it may be readily repaired by removing only the broken portion and substituting another section. The adjacent extremities of any two sections are secured to sliding plate 74.

In Figs. 20 and 21 is illustrated a modified form of belt consisting of three strips 1 2 3. The center strip consists of leather or other suitable belting material sewed through and through or re-enforced with wire 4. The middle strip is provided on each side with a coating of india-rubber or other suitable insulating material, so as to make the belt an insulator, and thus render it valuable for use in connection with electrical appliances. The main belt 21, as well as belts 27 and 28, should be formed of this material.

From the description heretofore given the operation of the mechanism will be readily understood. Before starting the car crank 59 is so adjusted as to throw the desired member of the double clutch to engagement with pulley 26, or, rather, ready to automatically engage the pulley at the proper time. Shaft 23 is of course stationary, except when winding or unwinding belt 21. The teeth of the member of the double clutch in engagement with pulley 26 are so shaped that they will permit pulley 26 to move in the direction opposite the movement of the car and in the same direction as the axle, while shaft 23 remains stationary or is moving in the same direction as the axle, since belt 28 is crossed.

From the description of the mechanism heretofore given it will be seen that shaft 23 remains stationary until near the point where it is desired to stop the car. Clutch 30 is then thrown to engagement with pulley 25 and shaft 23 rotated in the same direction as the car-axle, thus winding up belt 21 and compressing springs 11 or 75, as the case may be. This winding of the belt with the compression of the springs acts as a brake in stopping the car. When it is desired to start the car, clutch 30 is disengaged from pulley 26, when belt 21 begins to unwind by the action of the springs, thus turning shaft 23 opposite the movement of the axle, but imparting motion to the axle in the forward direction, since pulley 26 is now moving with its shaft, and belt 28, connecting said pulley with a pulley on the axle, is crossed. Thus it appears that the power stored in stopping the car is utilized in starting it again, as hereinbefore mentioned.

The action of the brake-shoe upon the belt 21 has been fully explained. This brake-shoe may be utilized to check the unwinding of belt 21 either wholly or partially before the power stored in the springs has become exhausted. When the end of the line is reached and it is desired to run the car in the opposite direction, crank 59 is reversed, so as to release one member of the double clutch and throw the other member into engagement with pulley 26, when the operation of the mechanism is the same as just described.

Having thus described my invention, what I claim is—

1. The combination, with a vehicle mounted upon wheels, of a series of elliptical springs connected by suitable blocks slidingly mounted upon stationary guide-rods, and a belt or cable secured at one extremity to one of the outer springs of the series and at the opposite extremity to a winding mechanism actuated from the axle of the vehicle, whereby the springs may be compressed as the vehicle moves forward and the power thus stored utilized in imparting motion thereto, as set forth.

2. The combination, with a vehicle mounted upon wheels, of a spring or series of springs, a belt or cable connected with said spring or series of springs at one extremity and at the opposite extremity with a winding mechanism actuated from the axle of the vehicle, whereby the springs may be compressed as the vehicle moves forward, and a double clutch located on the same shaft as the winding mechanism and consisting of two members having oppositely-fashioned teeth or clutch-faces, both rotating with the shaft, but independently movable longitudinally thereon, one sliding within the other, a pulley 26, located on the shaft and fashioned to engage both members of the clutch mechanism, said pulley being suitably connected with another pulley upon the axle, and means for alternately connecting and disconnecting the two members of the clutch and the pulley 26, whereby as the winding mechanism is released the stored power is returned to the axle as a direct propelling force, one member of the clutch being employed when the vehicle is moving in one direction and the other member when it is moving in the opposite direction, substantially as described.

3. The combination, with a vehicle mounted upon wheels, of a spring or series of springs, a belt or cable connected with said spring or series of springs at one extremity and at the opposite extremity with a winding mechanism actuated from the axle of the vehicle, whereby the springs may be compressed as the vehicle moves forward, and a double clutch located on the shaft of the winding mechanism and consisting of two members having oppositely-disposed teeth, these members being connected with each other and rotating together on the shaft, a disk or pulley also mounted upon the shaft and having its face recessed or toothed to engage both members of the clutch, a suitable connection between this pulley or disk and a rigid wheel or pulley on the axle, and means for alternately connecting and disconnecting the two members of the clutch and the corresponding recessed pulley or disk, whereby as the winding mechanism is released the stored power is returned to the axle as a direct propelling force, one member of the clutch being employed when the vehicle is moving in one direction and the other member when it is moving in the opposite direction, substantially as described.

4. The combination, with a vehicle mounted upon wheels, of a spring or series of springs, a belt or cable connected with said spring or series of springs at one extremity and at the opposite extremity with a winding mechanism actuated from the axle of the vehicle, whereby the springs may be compressed as the vehicle moves forward, and a clutch-disk located on the same shaft as the winding mechanism, and a pulley located on the shaft and having one face fashioned to engage said disk, the disk or pulley being provided with a pawl automatically adjustable and adapted to separate the faces, so as to make a noiseless escapement when the vehicle is moving in one direction, one member (the disk or pulley) of the clutch being suitably connected with the axle of the vehicle, whereby as soon as the winding mechanism is released the power stored in the springs is communicated to the axle, substantially as described.

5. The combination, with a vehicle mounted upon wheels, of a spring or series of springs, a belt or cable connected with said spring or springs at one extremity and at the opposite extremity with a winding mechanism actuated from the axle of the vehicle, whereby the springs may be compressed as the vehicle moves forward, a double clutch located on the same shaft as the winding mechanism and consisting of two members having oppositely-fashioned teeth or clutch-faces, both rotating together with the shaft, but independently movable longitudinally thereon, two longitudinally-sliding disks located on the shaft and respectively connected with the two members of the clutch by means of pins rigidly secured to the disk at one extremity and entering sockets in the clutch members at the opposite extremity, said sockets being of such depth as to permit some movement of the pin extremities therein without moving the members, springs located between the disks and the clutch members, a pulley 26, located on the shaft and fashioned to engage both members of the clutch mechanism, said pulley being suitably connected with another pulley upon the axle, means whereby the disks are simultaneously moved in opposite directions longitudinally upon the shaft and one clutch member connected and the other disconnected from the engaging face of the pulley 26, and a movable pawl for each clutch member, whereby said member, when disengaged from the clutch-face of the pulley, shall be held just from engagement therewith, making a noiseless escapement, one clutch member being employed when the vehicle is moving in one direction and the other when it is moving in the opposite direction, substantially as and for the purpose set forth.

6. The combination, with a vehicle mounted upon wheels, of a spring or series of springs, a belt or cable connected with said springs at one extremity and at the opposite extremity with a winding mechanism actuated from the axle of the vehicle, whereby the springs may be compressed as the vehicle moves forward and the power thus stored utilized in imparting motion thereto, and an automatically-adjustable spring-supported brake-shoe adapted to engage the belt or pulley, whereby the distribution of the stored power is under perfect control, substantially as described.

7. The combination, with a vehicle mounted on wheels, of a spring or series of springs, a belt or cable connected with said spring or springs at one extremity and at the opposite extremity with a winding mechanism actuated from the axle of the vehicle, whereby the springs may be compressed as the vehicle moves forward and the power thus stored utilized in imparting motion thereto, and a spring-supported brake-shoe adapted to engage the belt or cable, said shoe being supported in a frame and guided and held in position by inclined arms pivoted to the frame and to the shoe, whereby the shoe is automatically adjustable, and means for drawing the shoe away from the belt and for locking the shoe in the desired position and releasing it at will, substantially as described.

In testimony whereof I affix my signature in presence of two witnesses.

MARION M. BAILEY.

Witnesses:
WM. McCONNELL,
F. H. JOHNSON.